United States Patent [19]
Beidler et al.

[11] Patent Number: 5,362,081
[45] Date of Patent: Nov. 8, 1994

[54] WHEELCHAIR DRIVE SYSTEM

[76] Inventors: Michael T. Beidler, 12265 NW. Coleman, Portland, Oreg. 97229; Michael J. Beidler, 123 First St., Halfway, Oreg. 97834

[21] Appl. No.: 29,153

[22] Filed: Mar. 10, 1993

[51] Int. Cl.$^5$ ............ B60K 41/26; B62M 1/14; F16H 3/44
[52] U.S. Cl. .................... 280/250.1; 74/143; 74/377; 192/6 A; 280/236; 280/238; 280/244; 475/297
[58] Field of Search ........... 280/250.1, 304.1, 236, 280/238, 242.1, 244; 192/6 A; 74/143, 377; 475/297

[56] References Cited

U.S. PATENT DOCUMENTS

| | | | |
|---|---|---|---|
| 4,358,126 | 11/1982 | Mitchell et al. | 280/250.1 |
| 4,727,965 | 3/1988 | Zach et al. | 280/250.1 |
| 4,762,332 | 8/1988 | Seol | 280/250.1 |
| 5,167,168 | 12/1992 | Beumer | 280/250.1 |
| 5,184,837 | 2/1993 | Alexander | 280/250.1 |

FOREIGN PATENT DOCUMENTS 18811 of 1903 United Kingdom .

Primary Examiner—Mitchell J. Hill
Attorney, Agent, or Firm—Kolisch, Hartwell, Dickinson, McCormack & Heuser

[57] ABSTRACT

A wheelchair drive system is described that operatively interposes a plural-speed hub subsystem between conventional rotatable hand wheels and their corresponding drive wheels, thereby providing wheelchair propulsion by rotary motion of the hand wheels and selective engagement of the drive wheels dependent upon a manually operated gear-shifting mechanism. Preferably, the hub subsystem includes symmetric left- and right-handed hubs each including a hub body fixedly connected with an easily accessible hand wheel, with the hub body rotating about a spindle fixedly mounted on the wheelchair and selectively gear-connectable to the drive wheel, the spindle being selectively connected to the drive wheel by the operation of a manually shiftable, plural-speed gear train. The gear train includes plural sets of planetary, sun and ring gears, with the sun gears mounted on the spindle, the ring gears formed along an inner surface of the hub body, and the planetary gears positioned along a mounting member that is shiftable lengthwise in parallel with the spindle's central axis. The mounting member is spring-biased against a first side of the hub body, with that member being shiftable against the spring's tension into alternative positions by a shift rod that extends along a central void formed within the spindle. The shift rod is positionable by manual operation of a shift bar connected therewith that extends outwardly of the wheelchair to a position of easy access by the wheelchair's user. A clutch and an active brake may be provided for smooth, at-speed shifting between plural speeds and for stopping.

11 Claims, 3 Drawing Sheets

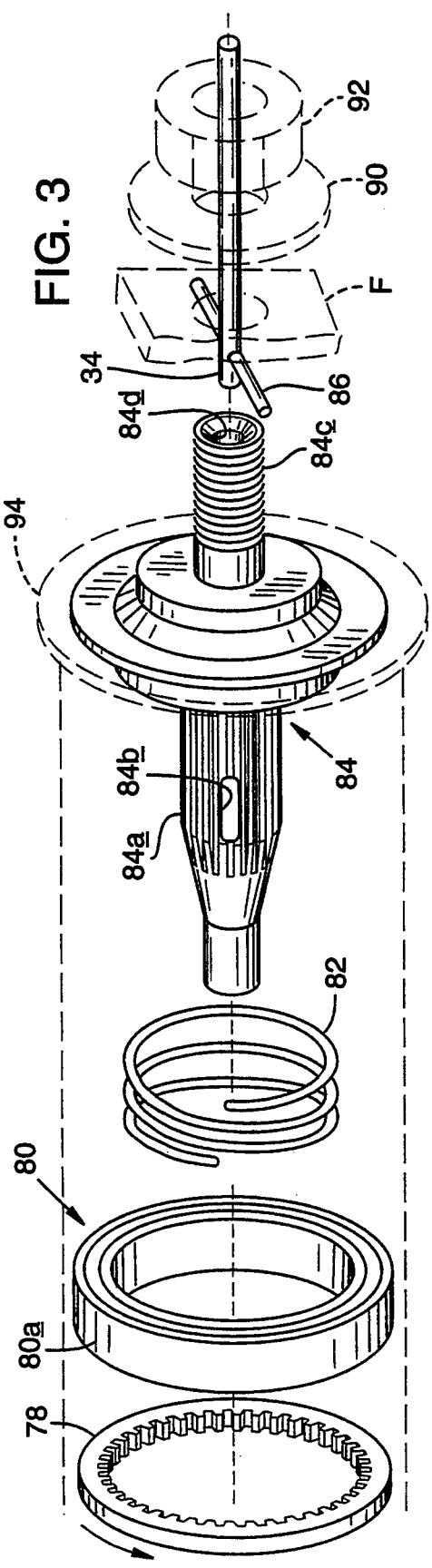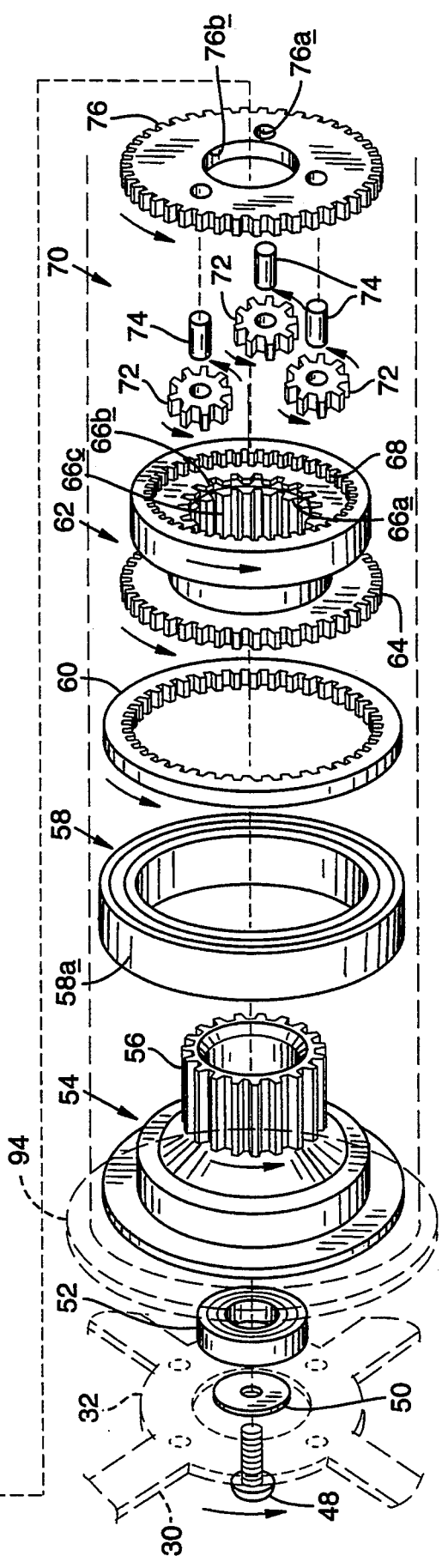

WHEELCHAIR DRIVE SYSTEM

BACKGROUND AND SUMMARY OF THE INVENTION

The present invention relates generally to wheelchairs. More particularly, it concerns a drive system for wheelchairs that provides plural-speed, drive-wheel operation via hand wheels selectively operatively connected via a hub subsystem to the wheelchair's drive wheels.

Wheel chair drive systems are known that include plural-speed hub assemblies including toothed gears that provide speed changing and wheelchair propulsion via selective manual positioning of a speed change control handle and via oscillatory manual operation of a propulsion lever, flywheel and operatively connected drive wheels. Such drive systems obtain some mechanical advantage for the user who may lack upper body mobility and/or strength as well as providing lower speeds for uphill travel. Wheelchairs are known that provide hand wheels fixedly attached to corresponding drive wheels for manual rotary operation of the drive wheels via manual rotary operation of the hand wheels. Such direct-drive wheelchairs also provide some mechanical advantage, but require relatively great upper body mobility and strength especially when the traveled terrain is uphill and down.

The invented wheelchair drive system uniquely combines certain of the advantages of conventional drive systems by providing a plural-speed hub subsystem operatively connected between a wheelchair's hand wheels and corresponding drive wheels. By operatively interposing plural-speed hub subsystems between conventional rotatable hand wheels and their corresponding drive wheels, more natural rotary motion of the hand wheels propels the wheelchair by selectively engaging the drive wheels dependent upon a manually operated gear-shifting mechanism. Such greatly facilitates wheelchair operation by users of different strengths and facilitates wheelchair travel over uneven terrain.

Preferably, each of dual hub subsystems includes a hub body fixedly connected with easily accessible hub-rotator structure (i.e. a hand wheel) and with a corresponding drive wheel. Hub-coupling structure, preferably in the form of a hub spindle, is fixedly attached to the wheelchair and provides a coupling between it and a manually shiftable, plural-speed transmission substructure of the hub. Operator actuation of a hand wheel causes rotation of the hub about an axis defined by the spindle. The spindle is selectively drive wheel-connected by operation of the plural-speed transmission substructure.

The transmission substructure, also referred to herein as a gear train, preferably includes plural sets of planetary, sun and ring gears, with the sun gears mounted on the spindle, the ring gears formed along an inner surface of the hub body and the planetary gears positioned along a mounting member that is shiftable lengthwise in parallel with the spindle's central axis. The mounting member is spring-biased against a first side of the hub body, with the member being shiftable against the spring's tension into alternative positions by a shift rod that extends along a central void within the spindle. The shift rod is positionable by manual operation of a shift bar connected therewith that extends outwardly of the spindle and provides easy user access via a cable-connected shift lever. A clutch, an active brake, and/or a parking brake may be provided for smooth, at-speed shifting between plural speeds and stopping/parking when riding on difficult terrain or when the user fatigues.

These and additional objects and advantages of the present invention will be more readily understood after a consideration of the drawings and the detailed description of the preferred embodiment.

BRIEF DESCRIPTION OF THE DRAWINGS

FIG. 3 is an enlarged, exploded, isometric assembly drawing of the invented hub subsystem that forms a part of the drive system shown in FIG. 1.

DETAILED DESCRIPTION OF THE PREFERRED EMBODIMENT

Figure 1:
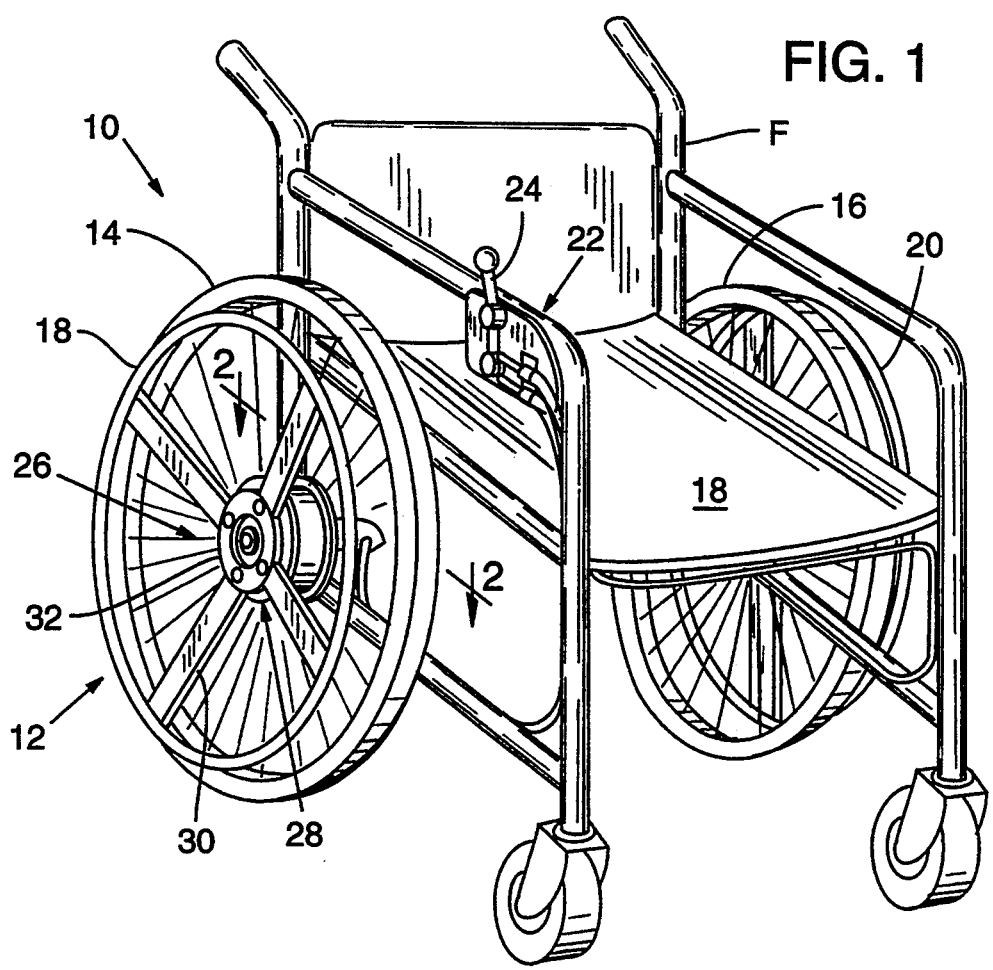
FIG. 1 is an isometric view of a wheelchair including the invented drive system made in accordance with its preferred embodiment.

Referring first briefly to FIG. 1, a wheelchair 10 is shown in which the invented drive system, indicated generally at 12, may be used. As is conventional, wheelchair 10 includes a frame F rotatably mounting dual, laterally-spaced, drive wheels 14, 16 for propelling a user seated on a frame-mounted seat 17 along terrain in a desired path achieved by disproportionate rotation of dual laterally spaced rotatable hand wheels 18, 20. Invented drive system 12 will be understood to include both conventional elements such as drive wheels 14, 16, as well as non-conventional elements such as a manually operable gear-shifting mechanism 22 including, for example, a shift lever 24 controlling one or more shift cables. As will be understood, hand wheels 18, 20 may also be thought of in a broader sense as hub-rotator structure.

Drive system 12 also may be seen to include what will be referred to herein as a hub subsystem 26, to be described in detail by reference to FIGS. 3 through 5, including dual hubs such as hub 28 shown in FIG. 1, one each of which operatively interposes hand wheels 18, 20 and their corresponding drive wheels 14, 16 to provide plural speed manually operable shifting control to the user of wheelchair 10. One or more radial struts, such as strut 30, rigidly connect hand wheels 18, 20 to their corresponding hubs such as hub 26, e.g. via a ring member 32 that, as will be seen, is operatively connected to hub subsystem 26. It will be appreciated that wheelchair 10 may be equipped with conventional accessories including the illustrated pivotal front wheels, push bar, armrests, seatback, etc. It also will be appreciated that, for the sake of clarity, conventional spokes that connect drive wheels 14, 16 with their corresponding hubs are not shown in FIG. 1. With respect to the materials used to make drive wheels 14,16, any suitable material may be used and the wheels may be either inflatable or inflationless.

Figure 2:
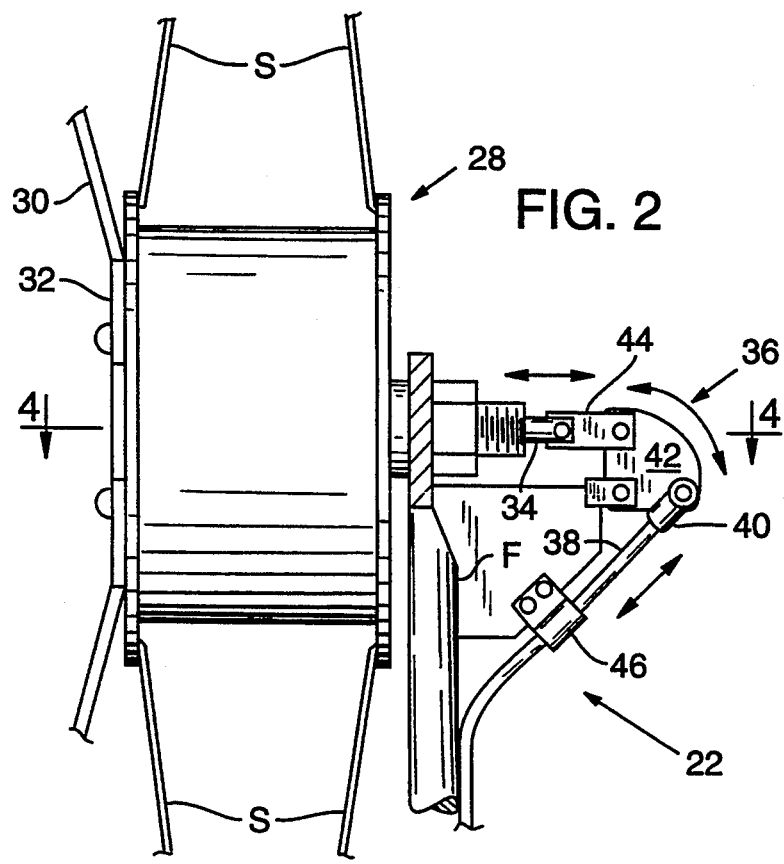
FIG. 2 is a fragmentary enlarged detail top elevation of part of the gear-shifting mechanism taken generally along the lines 2—2 of FIG. 1.

Turning very briefly to FIG. 2, a part of gear-shifting mechanism 22 that is connected to hub 28 is shown in a fragmentary top plan view. Right-handed hub 28 may be seen to include a shift rod 34 that may be positioned as desired along its long axis by suitably positioning lever 24 (refer to FIG. 1), which is connected to rod 34 via a conventional frame F-mounted shift mechanism 36 that translates and rotates push-pull motion of a cable within a conduit 38 into push-pull motion of rod 34. Shift mechanism 36 will be seen to include, for example, a cable gripping member 40, a pivotal wing member 42, a rod-gripping member 44 and one or more conduit guide/support members such as member 46. FIG. 2 also may be seen to show an outer portion of hub 28 that connects via spokes S to drive wheel 14 (refer again to FIG. 1). It will be appreciated that gear-shifting mechanism 22 may take any of a variety of forms, within the spirit and scope of the invention.

Turning next to FIG. 3, a plural-speed gear train, also referred to herein as plural-speed transmission substructure, which forms a part of right-handed hub 28 of hub subsystem 26 (the one on the left in FIG. 1) is viewable in exploded isometric view, with certain connected elements of wheelchair 10 shown only fragmentarily and in phantom by the use of dashed lines. Dual spaced hubs such as hub 28 will be understood to be virtual left-to-right "mirror images" of one another. The right-handed one of which is depicted and described in detail herein provides understanding of both hubs. It will be understood that the illustrated gear train provides, in accordance with the preferred embodiment of the invention, two forward and two reverse speeds, as well as neutral. Plural speeds refers to a gear ratio between rotation of hand wheels 18, 20 and their corresponding drive wheels 14, 16, as will be better understood by reference to FIGS. 4 and 5.

Starting at the lower left of FIG. 3, the components of the gear train include ring member 32 and connected radial members 30 (shown in phantom and fragmentarily); a securing bolt 48 and associated washer 50; a central, inboard bearing assembly 52, a driver member 54 including a first toothed drive gear 56; a first outboard bearing assembly 58; a first toothed ring gear 60; an intermediary drive member 62 including a second toothed drive gear 64, a spaced pair of first toothed intermediary ring gears 66a, 66b forming therebetween a cylindrical opening 66c, and a second, larger diameter ring gear 68; a planetary gear system 70 including three planetary gears 72 mounted for rotation on corresponding axles 74; and a third toothed drive gear 76 having three holes 76a formed peripherally therein and a hole 76b formed centrally therein. Those of skill in the art will appreciate that planetary gear-mounting axles 74 are fixed within holes 76a of third drive gear 76 when the illustrated gear train is assembled within hub 28.

Continuing now from the upper left corner of FIG. 3, the gear train further includes a second ring gear 78; a second outboard bearing assembly 80; a cylindrical coil spring 82; a hub spindle 84 including a toothed drive gear 84a, having a slotted hole 84b formed transversely therein generally centrally within the region of drive gear 84a and having an external threaded region 84c formed in an end region opposite that in which drive gear 84a and slotted hole 84b are formed; shift rod 34 having a transversely extending elongate member 86 in an inward end thereof; a frame F; a washer 90; and a securing nut 92. Those of skill in the art will appreciate that rod 34 and member 86 are slidably captured within a central bore 84d formed within spindle 84, with member 86 extending on either side from slotted hole 84b therein into cylindrical opening 66c within the interior of intermediary drive member 62. The preferred, specific positioning of rod 34 within opening 66c will be described further in connection with FIG. 5.

As noted above, spindle 84 is preferably part of the gear train, however it need not be so constructed. Apart from its preferred incorporation in the gear train, spindle 84 functions as hub-coupling structure being fixedly attached to wheelchair 10, and defining a rotational axis about which the operator may rotate hub 28 as will be further described below. It should be understood from an overview point-of-view that operator rotation of hub-rotator structure (i.e. hand wheels 18, 20) will deliver a driving force to the corresponding drive wheels (e.g. drive wheels 14, 16). The transmission substructure illustrated in FIG. 3 is operable to transfer the operator-delivered driving force from the hub-rotator structure to each drive wheel.

Figure 4:
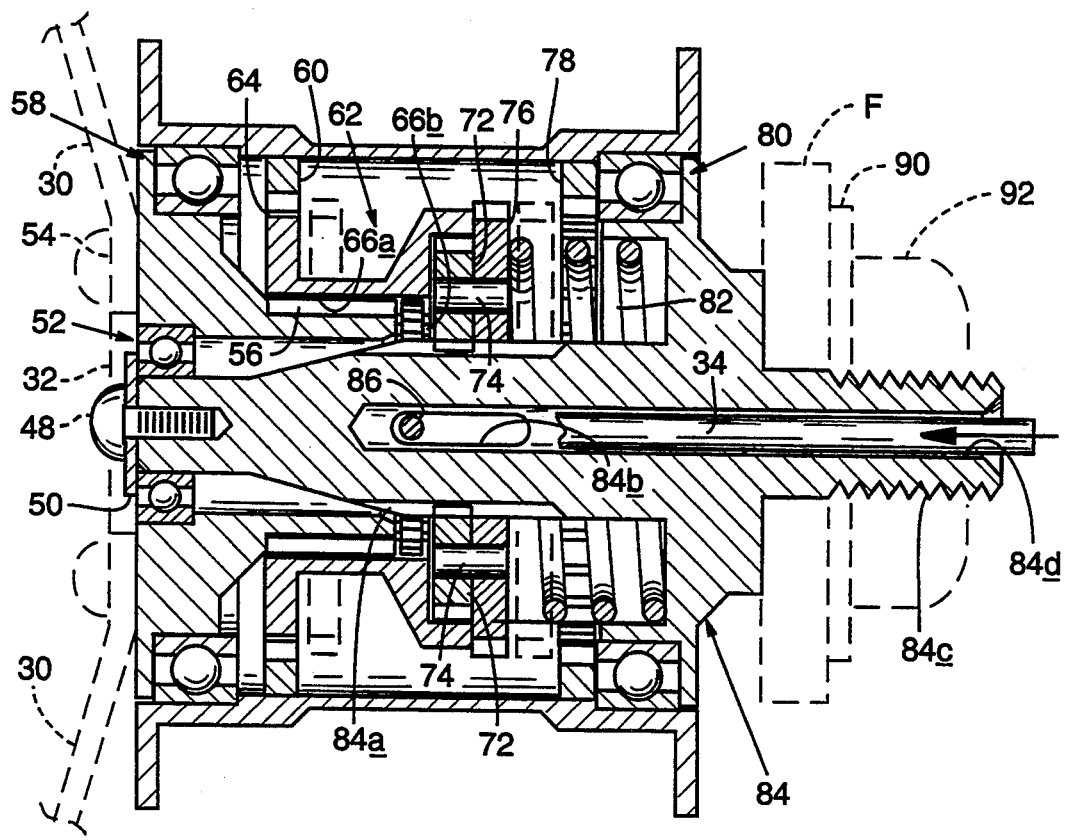
FIG. 4 is an enlarged, fragmentary, cross-sectional front elevation of the invented hub subsystem, in a selected phase of its operation, taken generally along the lines 4—4 of FIG. 2.
Figure 5:
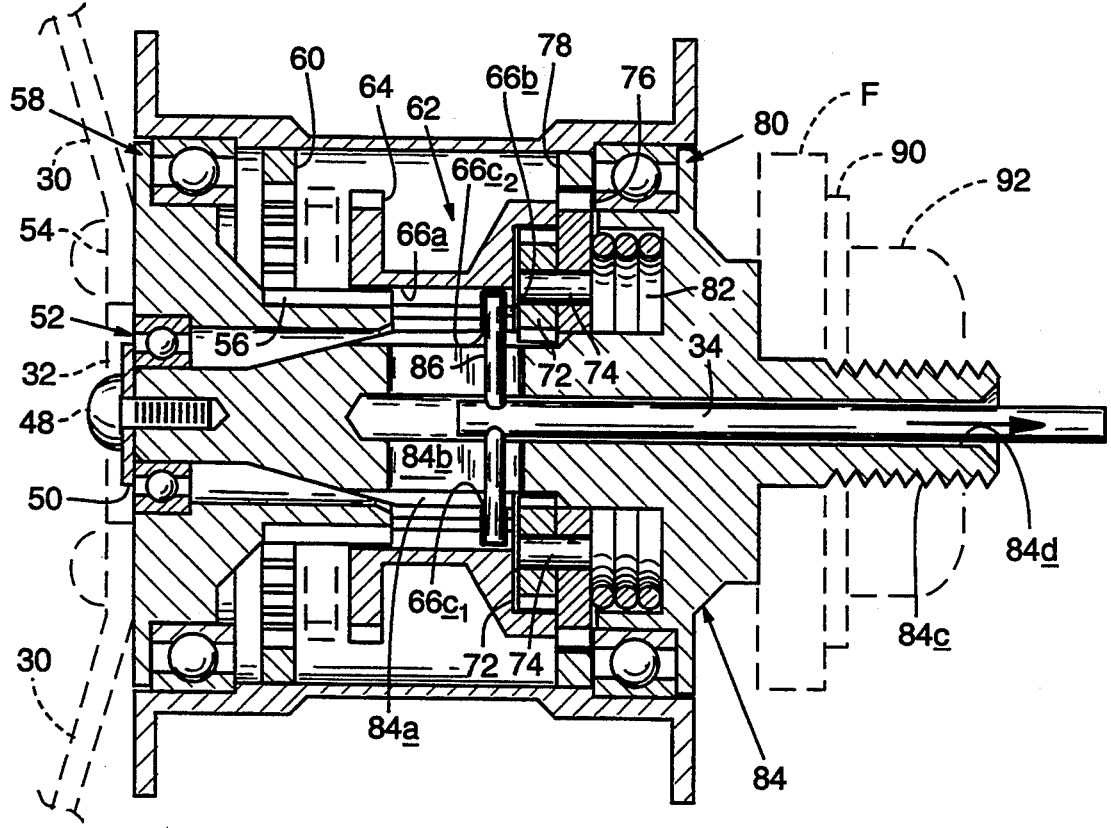
FIG. 5 is a top plan view corresponding to the front elevation of FIG. 2, and showing the hub subsystem in a different selected phase of its operation.

Referring now to the lower left of FIG. 3, it will be understood that the elongated cylindrical dashed outline represents a support member 94 that mounts spokes S (FIG. 2) of drive wheel 14 (not shown in FIG. 3), although of course its length is greatly exaggerated, as will be become clear by reference to FIGS. 4 and 5. Outer sleeves 58a, 80a of outboard bearing assemblies 58, 80 and the outer peripheries of ring gears 60, 78 fixedly mount to corresponding inner cylindrical surfaces of support member 94 and spindle 84 is fixedly frame mounted, whereas all other components of the gear train are mounted within hub 28 for rotation relative to support member 94.

Briefly in explanation of the gear train's operation when assembled within hub 28, it will be seen that rotation of hand wheel 18 causes rotation of ring member 32 suitably secured to driver 54, causing rotation of intermediary gear 62, which causes same-direction rotation of drive gears 64 and 76. Depending upon the axial position of intermediary gear 62 and drive gear 76 connected therewith relative to ring gears 60, 78, there will be either (1) no rotation of either ring gear, representing an idle or neutral gear shift speed of wheelchair 10; (2) rotation of ring gear 60, representing a first forward or reverse speed of wheelchair 10; or (3) rotation of ring gear 78 in a down-speed ratio provided by planetary gears 72, representing a second forward or reverse speed of wheelchair 10, with the speed ratio between the positions described in (2) and (3) depending upon the gear ratios among the various toothed components of the gear train, e.g. the speed ratio may be determined effectively by the diametric ratio between equi-diameter, revolving and rotating planetary gears 72 and toothed gear region 84a of fixed spindle 84.

With respect to materials for forming the above-described gear train shown in FIG. 3, any suitable materials may be used. The presently preferred material for member 54, gears 60, 76, 78 and spindle 84 is aluminum, for sleeves 58a and 80a is a self-lubricating plastic such as that marketed under the trademark NYLOTRON, for intermediary drive member 62 is plastic, and for planetary gears 72 is brass.

Turning now to FIG. 4, a front cross-sectional fragmentary view of assembled hub 28 briefly will be described. Initially, it may be seen that spindle 84 is fixedly mounted to frame F of wheelchair 10 to prevent its rotation. Thus, manual rotation of hand wheel 18 and, consequently, rotation of radial members 30 and ring member 32, causes driver assembly 54 freely to rotate about spindle 84 by the operation of inboard bearing assembly 52, and freely to rotate within spoke support 94 by the operation of outboard bearing assemblies 58, 80. Independent of the position of shift rod 34 between its two extrema defined by slotted hole 84a, intermediary gear 62 rotates with driver assembly 54, thereby urging rotation of planetary gears 72 on their axles 74. Because spindle 84 is fixed, and because its toothed gear region 84a engages corresponding teeth along an inner tangential extent of planetary gears 72, this rotation urging of planetary gears 72 causes drive gear 76 to rotate, with the inner surface of its centrally located hole 76b slipping freely around gear region 84b of spindle 84.

Contrasting FIGS. 4 and 5, when intermediary gear 62 is in the position shown in FIG. 4, with drive gear 64 operatively engaging ring gear 60 as illustrated, spoke support 94 and thus drive wheel 14 rotates at zero speed reduction with hand wheel 18, providing high-speed forward or reverse travel by wheelchair 10. When intermediary gear 62 instead is in the position shown in FIG. 5, with drive gear 76 operatively engaging ring gear 78 as illustrated, spoke support 94 and thus drive wheel 14 rotates at a predefined speed reduction with hand wheel 18, providing low-speed forward or reverse travel by wheelchair 10. Finally, when intermediary gear 62 is in between the two extreme positions described, e.g. in an intermediate position represented by the dashed outlines of drive gears 64, 76 in which neither engages either of ring gears 60, 78, there is no rotation of spoke support 94 and thus drive wheel 14 with hand wheel 18, providing a neutral gear in which wheelchair may only coast or stop.

It now may be understood how shift rod 34, the position of which is manually controlled by the user's operation of shift lever 24, positions intermediary gear 62 to provide same-direction, plural-speed linkage of drive wheels 14, 16 with their corresponding hand wheels 18, 20. Brief reference to FIGS. 4 and 5 clarifies how drive gear 76 and planetary gears 72 mounted for rotation thereon are held in place for engagement with ring gear 68 of intermediary gear assembly 62 by tension from coil spring 82, and how shift rod 34 effects the positioning of intermediary gear assembly 62 by capture within cylindrical slots $66c_1$-$c_2$ (FIG. 5) of transverse member 86. Those of skill in the art will appreciate that modifications may be made to the gear train illustrated and described herein, without departing from the spirit and scope of the invention. For example, different numbers and arrangements of gear assemblies may provide different or more speeds, a clutch may be added, or the drive system may include an active brake mechanism that uses the gear train to resist inadvertent wheelchair travel.

The invention may be described as a plural-speed, or multi-speed, rotationally actuable wheel-chair, e.g. hub 28, that is drivingly connected to a spindle 84 that is fixedly mounted on a wheel chair, e.g. wheelchair 10. It may be understood to include hub rotator structure, i.e. hand wheel 18, positioned for use by an operator of such wheelchair to deliver a driving force to the drive wheel, and hub substructure, also referred to herein as hub subsystem interposing hub rotator structure 18 and the drive wheel(s). The invention also includes hub driver 54 fixedly attached to hub rotator structure 18, with the hub driver being connected with plural-speed transmission structure, e.g. the gear train described and illustrated herein, coupled to axle 54 for transferring the driving force to the drive wheel(s). Also included in the invention is manually operable shift structure, e.g. shift mechanism 22 and shift rod 34, for shifting the transmission from one speed to another.

The invented plural-speed wheelchair may be seen preferably to include a plural-speed manual drive system 12 that preferably includes spindle 84 fixedly attached to the frame F of the wheelchair wherein spindle 84 defines an axis about which a drive wheel, e.g. drive wheel 14, rotates; first (inboard) bearing 52 associated with spindle 84; driver 54 mounted on first (inboard) bearing 52 for rotation about spindle 84; a hand wheel, e.g. hand wheel 18, attached to driver 54 wherein the hand wheel and driver 54 are rotatable as a unit about the spindle's axis; second (also referred to herein as first outboard) bearing 58 associated with driver 54; a drive wheel-connecting hub member, e.g. spoke-support member 94, mounted on second bearing 58 for rotation also about the spindle's axis relative to both spindle 84 (which is fixed) and driver 54 (which is rotatable); and intermediate gears, e.g. at least drive gear 56 and its associated ring gears 66a, 66b, drive gear 64 (which is associable with ring gear 60), splined gear region 84a of spindle 84 and its associated planetary gears 72 that revolve and rotate thereabout, ring gear 68, and drive gear 76 (which is associable with ring gear 78) supported by spindle 84 for selectively engaging driver 54 to hub member 94, with such intermediate gears selectively providing at least two-speed, e.g. low-speed and high-speed, and preferably also neutral, operation of the wheelchair via rotation of hub member 94 (having such associable ring gears 60, 78 mounted therein) relative to driver 54. It will be appreciated that more than two forward and reverse gears may be provided, or that only forward, plural-speed operation may be provided, or that only reverse, plural-speed operation may be provided, all within the spirit and scope of the invention.

It will be understood that, preferably, hub member 94 includes a first and second laterally spaced ring gears 60, 78 fixedly attached to an inner surface thereof. It also is preferred that the intermediate gears include first drive gear 64 selectively engageable with first ring gear 60, and second drive gear 76 rotated by planetary gears 72 for selectively engaging second ring gear 78 (at the above-described gear- or speed-reduction ratio, thereby providing for selective plural-speed, e.g. two forward and two reverse speeds, rotation of hub member 94 relative to driver 54. Preferably, the intermediate gears are slidably positionable within hub member 94 to permit the selective engagement between first drive gear 64 and first ring gear 60 and between second drive gear 76 and second ring gear 78.

Preferably, the invented drive system further includes, as described above, spring 82 supported by spindle 84, wherein spring 82 normally forces intermediate gears into selective engagement between first drive gear 64 and first ring gear 60 (as illustrated in FIG. 4). Also preferably, the drive system further includes, as described above, a shift rod 34 operatively connected to the intermediate gears for manually (e.g. by operation of mechanism 22 including preferably an easily accessed, manual shift lever 24) slidably positioning the same within hub member 94 into an alternate position of selective engagement between second drive gear 76 and second ring gear 78 (as illustrated in FIG. 5). Finally, invented drive system 12 preferably includes planetary gears 72 revolving within third ring gear 68 that forms a unitary part of the slidable intermediate gears, and wherein planetary gears 72 rotate on plural gear axles 74 mounted on second drive gear 76, and wherein spring 82 urges planetary gears 72 and second drive gear 76 into operative engagement with third ring gear 68, independent of the slidable positioning of said intermediate gears within said hub member (as may be seen by comparing FIGS. 4 and 5, wherein gears 68, 72, 76 move as a unit to the left or the right, irrespective of position).

Those of skill in the art will appreciate from the included description and illustrations that left-handed hub 30 is identically structured with hub 28, except that of course it is a right-to-left "mirror image" thereof and the shift cable routed thereto for plural-speed gear shifting is routed differently, e.g. from shift lever 24 which, preferably, commonly operates both hubs. Similarly, a left-handed shift mechanism corresponding with right-handed mechanism 36 shown in FIG. 2 may be used with hub 30. It will be appreciated that, in accordance with a proposed alternative embodiment, there may be a common axle extending between drive wheels 14, 16 and the drive system of the invention in such case might have only a single plural-speed hub with spindle 84 fixedly mounted on the axle, and with the opposite hub being an idler. Other changes may be made, yet are believed to be within the spirit of the invention defined by the appended claims.

The invented drive system may be seen to represent a significant improvement over conventional drive systems for use in a wheelchair to couple a manually rotatable hand wheel with an axle-mounted drive wheel for propelling the wheelchair. The improvement includes manually operable gear-shifting mechanism 22 and a hub subsystem 26, e.g. a subsystem including hub 28, interposing the hand wheel, e.g. hand wheel 18, and the drive wheel, e.g. drive wheel 14. Hub subsystem 26 includes hub driver 54 fixedly attached to the hand wheel for rotation therewith and hub spindle 84 selectively rotatably connected therewith and fixedly attachable to frame F of wheelchair 10. Hub subsystem 26 further includes one or more gear assemblies, e.g. driver gear 64 and selectively driven ring gear 60 and/or driver gear 76 and selectively driven ring gear 78, cooperative when selectively engaged by operation of gear-shifting mechanism 22 to produce rotation of the drive wheel in predefined relation to manual rotation of the hand wheel.

Preferably, hub subsystem 26 includes plural gear assemblies, e.g. driver gear 64 and selectively driven ring gear 60 and driver gear 76 and selectively driven ring gear 78, selectively engageable to produce various rotational speeds, e.g. the described low-speed and high-speed operation, of the drive wheel in response to rotation of the hand wheel. Also preferably, hub spindle 84 normally is spring biased, e.g. by coil spring 82, into a predefined positional relationship with hub driver 54, e.g. that illustrated in FIG. 4, to produce a corresponding predefined gear assembly engagement when said gear-shifting mechanism is not in operation, e.g. when shift rod is fully extended into bore 84d within spindle 84. Also preferably, hub driver 54 rotatably mounts the drive wheel via drive wheel-supporting member 94 equipped with plural ring gears 60, 78 operatively fixedly connected with member 94 and one or more drive gears, e.g. drive gears 64, 76, rotatably connected with hub driver 54.

Operation

Briefly reiterating its operational aspects, invented drive system 12 enables a user of wheelchair 10 easily to shift into a desired gear, or speed, while wheelchair 10 is at rest and then to grip the upper extents of hand wheels 18, 20 while rotating them forwardly or backwardly in an arc, thereby to propel wheelchair more easily up or down a hill. While the preferred embodiment of the invention described and illustrated herein does not provide a clutch, such easily may be incorporated into the invented drive system. Similarly, while the invented drive system does not include an active brake, such easily may be provided so that even smoother operation of wheelchair 10 may be achieved, yet without the strain that usually accompanies wheelchair use on uneven terrain or the ineffective operation by a relatively disabled, immobile or slight user.

While the present invention has been shown and described with reference to the foregoing preferred embodiment, it will be apparent to those skilled in the art that other changes in form and detail may be made therein without departing from the spirit and scope of the invention as defined in the appended claims.

We claim:

1. A multi-speed, rotationally actuable wheelchair hub drivingly connectable to a drive wheel of a wheelchair, comprising:

hand-wheel-rotator structure positioned for rotation by an operator of such wheelchair to deliver a driving force to the drive wheel;

hub-coupling structure;

plural-speed transmission substructure coupled to the wheelchair via hub-coupling structure being fixedly attached thereto, with the transmission substructure being operable to transfer the operator-delivered driving force from the hand-wheel-rotator structure to the drive wheel;

hub substructure interposing the hand-wheel-rotator structure and the drive wheel, and including a hub body fixedly attached to the hand-wheel-rotator structure and the drive wheel, with the body enclosing the plural-speed transmission substructure; and manually operable shift structure for shifting the transmission substructure from one speed to another.

2. For use in a wheelchair with a frame and a drive wheel for propelling the wheelchair, the improvement comprising:

a manually rotatable hand wheel;

a manually operable gear-shifting mechanism, and a hub subsystem interposing the hand wheel and the drive wheel, the hub subsystem including a hub spindle fixedly attachable to the frame, and a hub driver fixedly attached to the hand wheel and selectively rotatably coupled to the hub spindle, said hub subsystem further including one or more gear assemblies cooperative when selectively engaged by operation of said gear-shifting mechanism to produce rotation of the drive wheel in predefined relation to manual rotation of the hand wheel.

3. The improvement of claim 2, wherein said hub subsystem includes plural gear assemblies selectively engageable to produce various rotational speeds of the drive wheel in response to rotation of the hand wheel.

4. The improvement of claim 3, wherein said hub spindle normally is spring biased into a predefined positional relationship with said hub driver to produce a corresponding predefined gear assembly engagement when said gear-shifting mechanism is not in operation.

5. The improvement of claim 4, wherein said hub driver rotatably mounts said drive wheel via a drive wheel-connecting structure having plural ring gears operatively fixedly connected therewith and wherein said hub driver mounts a drive gear rotatably connected therewith.

6. A plural-speed manual drive system for use in a wheelchair having a drive wheel for propelling the wheelchair along a surface, the system comprising:
   an elongate cantilever spindle with a first end being fixedly attached to the wheelchair, and wherein said spindle defines an axis about which the drive wheel rotates, said spindle including a splined region;
   a first bearing associated with said spindle;
   a driver mounted on said first bearing for rotation about said spindle;
   a hand wheel attached to said driver wherein said hand wheel and driver are rotatable as a unit about said axis;
   a second bearing associated with said driver;
   a drive-wheel-connecting hub member mounted on said second bearing for rotation about said axis relative to said spindle and said driver, said hub member including an inner surface; and
   intermediate gears supported by said spindle for selectively engaging said driver to said hub member, said intermediate gears selectively providing plural-speed rotation of said hub member relative to said driver.

7. The drive system of claim 6 wherein said intermediate gears include plural planetary gears for revolving around a splined region of said spindle.

8. The drive system of claim 7, wherein said hub member includes first and second laterally spaced ring gears fixedly attached to an inner surface thereof, and wherein said intermediate gears include a first drive gear selectively engageable with said first ring gear and second drive gear rotated by said planetary gears for selectively engaging said second ring gear, thereby providing for selective two-speed rotation of said hub member relative to said driver.

9. The drive system of claim 8, wherein said intermediate gears are slidably positionable within said hub member to permit the selective engagement between said first drive gear and said first ring gear and between said second drive gear and said second ring gear.

10. The drive system of claim 9, which further comprises a spring supported by said spindle, wherein said spring normally forces said intermediate gears into selective engagement between said first drive gear and said first ring gear, and a shift rod operatively connected to said intermediate gears for manually slidably positioning the same within said hub member into an alternate position of selective engagement between said second drive gear and said second ring gear.

11. The drive system of claim 10, further including plural gear axles mounted on said second drive gear, wherein said planetary gears revolve within a third ring gear that forms a unitary part of said intermediate gears, and wherein said planetary gears rotate on said plural gear axles, and wherein said spring urges said planetary gears and said second drive gear into operative engagement with said third ring gear independent of the slidable positioning of said intermediate gears within said hub member.

* * * * *